(12) United States Patent
Hylands et al.

(10) Patent No.: US 7,197,600 B2
(45) Date of Patent: Mar. 27, 2007

(54) TRANSFERRING DATA ALONG WITH CODE FOR PROGRAM OVERLAYS

(75) Inventors: Dave Hylands, Brunaby (CA); Craig Hemsing, W. Vancouver (CA); Andrew Jones, Vancouver (CA); Henry W. H. Li, Vancouver (CA); Susan Pullman, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 790 days.

(21) Appl. No.: 10/032,667

(22) Filed: Oct. 24, 2001

(65) Prior Publication Data

US 2004/0205697 A1 Oct. 14, 2004

Related U.S. Application Data

(60) Provisional application No. 60/269,378, filed on Feb. 16, 2001.

(51) Int. Cl.
*G06F 12/00* (2006.01)
(52) U.S. Cl. .................. 711/132; 711/170; 719/331
(58) Field of Classification Search ............... 719/331, 719/332; 711/2, 118, 129, 132, 170; 717/106, 717/120, 121
See application file for complete search history.

(56) References Cited

U.S. PATENT DOCUMENTS

| 6,209,061 B1 * | 3/2001 | Nelson et al. ............... 711/132 |
| 6,512,775 B1 * | 1/2003 | Eleftheriades et al. ...... 370/428 |
| 6,734,872 B1 * | 5/2004 | Varga et al. ................. 345/629 |
| 6,748,520 B1 * | 6/2004 | Maynard et al. ............ 712/220 |
| 6,775,757 B1 * | 8/2004 | Greicar ........................ 711/170 |

FOREIGN PATENT DOCUMENTS

EP 0817096 A 1/1998

OTHER PUBLICATIONS

Presser L et al, "Linkers and Loaders", ACM Computing Surveys, New York, NY, US, vol. 4 No. 3, Sep. 1, 1972, pp. 149-167, XP000564734.
FTP Directory, ftp://ftp.iecc.com/pub/linker/, Internet Document, 'Online! XP002326289 retrieved from the internet: URL:ftp://ftp/iecc.com/pub/linker/, retrieved on Apr. 27, 2005.

(Continued)

*Primary Examiner*—William Thomson
*Assistant Examiner*—Andy Ho
(74) *Attorney, Agent, or Firm*—McAndrews, Held & Malloy, Ltd.

(57) ABSTRACT

The present invention provides a method for use with program overlays, wherein code segments, along with data segments pertaining to the code segments, are transferred into a receiving memory segment. Program code is separated into common code and overlay code. The overlay code is then broken down into segments according to functionality, and the need to create segments that will fit into a receiving memory segment. An overlay control file is created for each segment, then a wrapper file. Linker command files are created for the common area and code area. The wrapper files and linker command files are used to create a common image file for the code/data. The common image is used to produce overlay sections, which are then concatenated together into one file. This one file is then loaded into memory for transfer of the overlays to a receiving memory area.

28 Claims, 10 Drawing Sheets

OTHER PUBLICATIONS

Levine J et al?, 《Linkers and Loaders》Beta Site, 'Online !Aug. 8, 1999, pp. 7-26, 134, 214-225, XP002326283 retrieved from the Internet URL: ftp://.iecc.com/pub/linker/.

Spacek T R, "A Proposal to Establish a Pseudo Virtual Memory Via Writable Overlays", Communications of the ACM USA, vol. 15 No. 6, Jun. 1972, pp. 421-426, XP002326284.

IBM Technical Disclosure Bulletin, "Automatic OS Linkage Editor Overlay Control Specification Generation and Analysis. Jul. 1974.", IBM Technical Disclosure Bulletin, vol. 17 No. 2, Jul. 1, 1974, pp. 554-555, New York, NY, USA, XP002326285.

* cited by examiner

Linker Command File: Common Area

```
MEMORY
(      ... other memory sections removed ...
       PAGEDCODE(X) : ORIGIN = 0X4200, LENGTH = 0X1800
       PAGEDDATA    : ORIGIN = 0X6000, LENGTH = 0X1400
)
SECTIONS
(      ... other sections removed ...
       pagedCodeSection :
    (
       . = ALIGN (4) :
         _dem_gCodeOverlayAreaStart = ABSOLUTE ( . ) :
       . # . + 0x1800 :
         _dem_gCodeOverlayAreaEnd = ABSOLUTE ( . ) :
    ) > PAGEDCODE
       pagedDataSect :
    (
       . = ALIGN (4) :
         _dem_gDataOverlayAreaStart = ABSOLUTE ( . ) :
       . # . + 0x1400 :
         _dem_gDataOverlayAreaEnd = ABSOLUTE ( . ) :
    ) > PAGEDDATA
       .overlayDescr :
    (  _dem_gOverlayDescr = ABSOLUTE ( . ) :
       SHORT ( -2 )
    ) > INTDATA
)
```

FIG. 8A

Overlay Area

```
MEMORY
(      ... other memory sections removed ...
       PAGEDCODE(X) : ORIGIN = 0X4200, LENGTH = 0X1800
       PAGEDDATA    : ORIGIN = 0X6000, LENGTH = 0X1400
)
SECTIONS
(      ... other sections removed ...
       .text :
    (
       . = Align (4) :
       * ( . text)
    ) > PAGEDCODE
       .data
    (  . = Align (4) :

) > PAGEDDATA
)
```

FIG. 8B

TRANSFERRING DATA ALONG WITH CODE FOR PROGRAM OVERLAYS

RELATED APPLICATIONS

This application claims priority of U.S. provisional patent application having Ser. No. 60/269,378, entitled "Network Telephony Device," filed Feb. 16, 2001, which is hereby incorporated by reference in its entirety.

This application is also related to U.S. patent application having Ser. No. 10/003,563, (to be assigned), entitled "Apparatus and Method to Reduce Memory Footprints in Processor Architectures, "filed on Oct. 24, 2001, which is hereby incorporated by reference in its entirety.

FIELD OF THE INVENTION

The present invention provides a method for use with program overlays, wherein code segments, along with data segments, pertaining to the code segments are transferred into a receiving memory segment.

BACKGROUND OF THE INVENTION

Ethernet networks and the like for providing data communication among a plurality of computers are well-known. Such networks facilitate the transfer of data files, audio information and video information, as well as any other information which may be represented, in binary form, among the plurality of computers.

Networks can be conveniently divided into two broad categories, based upon their size. A local area network (LAN) is a group of computers which is connected so as to facilitate the sharing of applications, data and peripherals. Local area networks are generally confined to a single building or a small group of buildings.

A wide area network (WAN) is made up of a plurality of LANs which is connected together so as to facilitate communication therebetween. A WAN may cover a city, a state, a country or even be international in scope. The Internet is an example of a WAN that includes more than 2,000 separate packet-switched networks that are located all over the world.

The popularity of networks, such as the Internet, has increased the desire for additional network services, such as network telephony. The vast, high bandwidth network provides an ideal medium for audio communications. The nature of such telephone devices is to process voice signals that might come in over the network, typically as digital packets of information or the like. To process such signals, various computing and processing devices are used, typically in the form of integrated circuit configurations.

Memory is a component that is used by computing devices to store data and/or code to be used in processing data. Integrated solid-state processing devices generally have an area of associated memory on the same chip substrate where the processing components are formed. Such memory is generally formed close to the processing components in order to enhance the overall speed and efficiency of the device. Memory, however, often takes up more room on an integrated device than processing components, with higher storage capacities generally requiring more space on the chip. Hence, by incorporating a sufficient amount of memory on the same chip, the size of the chip layout is greatly increased. This is often not favorable, as larger chip layouts are more expensive to produce, take up more room in compact devices, and often draw more power. It is therefore desirable to reduce the amount of memory on certain processing devices. However, by reducing the memory, the amount of code and/or data that can be used on a given device is also reduced.

One resource intensive form of processing to be performed by certain integrated computer devices includes digital signal processing (DSP). DSP generally refers to various techniques for improving the accuracy and reliability of digital communications. A description of the general theory behind DSP can be quite complex and is not included here, but is well known in the art. In particular, DSP is used to clarify, or standardize, the levels or states of a digital signal. A DSP circuit is able to differentiate between humanmade signals, which are orderly, and noise, which is inherently chaotic. The number of MIPS (or millions of instructions per second) serves as a general measure of the computing performance of such a device. Accordingly, certain specialized DSP devices exist which are configured to perform signal processing in a more efficient manner than generalized processors. Signal processing communication devices often include a programmable DSP for processing varying levels of MIPS. A DSP processor is generally used for intensive real-time signal processing operations.

The code (or program) used by a processor can be written in a higher level language (i.e., C++), and then compiled down to a machine language (or assembly language) which is recognizable by the processor. Alternatively, a code developer can directly write assembly language, which is line-by-line usable by the processor. Writing and constructing code in a higher level language is usually much easier than directly writing assembly code, due to the structure afforded at the higher level. However, machine language that has been directly written, and not compiled from a higher level language, can be made to run much more efficiently on a processor. This is particularly true for processor intensive applications, such as digital signal processing. Accordingly, the code (or program) associated with a DSP is generally not written or developed in a higher level language. Instead, the code is carefully tailored and hand-optimized in order to increase processing efficiency and to reduce the amount of memory needed.

A dual processor configuration can also be employed where a second associated general purpose microprocessor unit (i.e., an MCU, having its own memory or external memory) is used for processing low-MIPS operations and protocol operations. As a result, fewer items need to be stored and/or processed on one processor versus another. The DSP, for instance, might have only certain hand-optimized code associated with the intensive real-time task of processing a signal. Accordingly, the associated memory for the DSP will be reduced.

Certain solutions exist to provide effective processing of programs (or data), in light of the reduced amount of memory available on the main processor. The use of overlays is one such solution. Overlays allow a program with large memory requirements to fit into a small memory footprint. For instance, a program might require more than 75 Kbytes words of RAM for storage, while a corresponding processor (DSP or the like) might have only 40 Kbytes of words. Overlays allow a portion of the code and data (plus constants) to be paged into the available memory space on an as-needed basis.

Overlays work by having a small wrapper routine present in a common area for the code. This wrapper routine is also referred to as a stub or proxy. When the wrapper is called, it causes the appropriate overlay code and data sections to be transferred into the reserve code and data areas in the main memory.

To illustrate certain aspects of overlays, FIG. 1 shows a representative prior art block diagram of certain code/data segments 100, and a memory area 120, associated with an overlay scheme. In this example, there are three code overlays 102, 104, and 106. For the data, two fill overlays are shown, with one data overlay divided (or shared) between two sections of code. A first half of the data overlay (shown as 108) is associated with code overlay 1 (102), wherein this code and data are collectively referred to as Overlay A (130). The other half of the data overlay (shown as 110) is associated with code overlay 2 (104), wherein this code and data are collectively referred to as Overlay B (140). The second full overlay (shown as the third data overlay 112) is associated with code overlay 3 (106), wherein this code and data are collectively referred to as Overlay C (150).

The memory is shown as 120 and is divided into areas containing common code and data 122, wrappers 124, a code overlay area 126, and a data overlay area 128. When one of the wrapper functions for a particular overlay is called, the wrapper function helps facilitate the transfer of the code/data for that overlay into the memory area 120, as shown generally by the arrows 152. For instance, if the wrapper function for overlay B (140) is called, the code overlay 2 (104) will be transferred into the code overlay area 126, and the data overlay /1;2 (110) will be transferred into the data overlay area 128. It is also possible for one overlay to call another overlay, with this arrangement generally referred to as nested overlays.

Prior implementations of overlays have used linker technology to create code and data segments that can be loaded into the processor memory area and executed. Such prior implementations, however, have been configured to use only a single copy of a data segment in the main memory area. If multiple parts of the algorithm code need to use that particular data, these parts will be referred to the single copy in memory. Moreover, only one single copy of a particular mathematical function (or the like) is stored in the main memory. When the particular function is called, the calling routine is referenced to the single copy of the function code for processing. This can be problematic in that a large portion of data or function code must be stored in main memory in order to be accessible by various functions or routines.

Instead, what is needed in the field is an overlaying mechanism to automatically cause data to be overlaid in a similar fashion as code. Accordingly, particular data can be isolated that belongs to a particular code section, and thereafter the data could be overlaid, along with the code, into a small memory area on a receiving processor.

SUMMARY OF THE INVENTION

The present invention provides for an apparatus and method for effectively utilizing a reduced memory footprint on a processor intensive device such as a DSP or the like. A piece of software (or algorithm) can be broken down into at least one overlay piece. The algorithm or software can be allocated, in part, for storage (or execution) on an external storage device. This external storage device would likely consist of slower-access memory, which is lower in cost than the faster-access memory associated with a high-MIPS processing device. The external memory is also not generally accessible by the processor. The faster-access memory will be limited in size and hence, certain techniques must be employed to provide the correct code/data to high-MIPS processor.

In order to transfer the correct code/data from external memory to the constrained segment of memory, the code/data is broken down into small segments which are commonly referred to as overlays. When a routine, which is located in this external memory is required, it is loaded into a shared common memory area and executed from there. This particular mechanism, which is typically referred to as an overlay manager, has been refined to the point that overlay management of code segments is already built into many linkers. Many DSP algorithms employ the use of lookup tables, and other forms of data storage, to improve the performance of a particular algorithm.

In the past, there has not been any way of automatically causing the data to be overlaid in a similar fashion to code. However, the present invention uses basic linker technology, but applies multiple passes of the linker so that the data that belongs to a particular code section is isolated. This isolation then makes it possible to overlay data along with code into a constrained memory location on a DSP processor or the like.

According to one aspect of the present invention, provided herein is a method for generating program overlays from a sequence of program code, each overlay having a set of code and related data contained therein, the overlays being transferred via an overlay manager from a storage area to a receiving area for processing, the method comprising the steps of: (a) breaking the sequence of program code into a set of segments, wherein each segment contains a certain amount of related code for processing; (b) running a code segment in the set through a linker device; (c) extracting the code segment and related data segment produced by the linker device, with each associated pair of code and data segments representing an overlay; (d) checking if more segments exist in the set, if yes, then return to step (b), else proceed to step (e); and (e) concatenating the overlays into a file which can be referenced by the overlay manager.

According to another aspect of the present invention, provided herein is a method for generating program overlays from a sequence of program code, the program code having common code and code to be overlaid, each overlay having a set of code and related data contained therein, the overlays being transferred via an overlay manager from a storage area to a receiving area for processing, the method comprising the steps of: (a) reserving a memory segment in the receiving area to hold overlaid code and data; (b) breaking the sequence of code to be overlaid into a set of segments, wherein each segment contains a certain amount of related code for processing, and each segment is sized to fit in the reserved memory segment; (c) creating stubs for each code segment, whereby the stubs represent entry points for functions within each code segment; (d) linking the common code along with the stubs for each code segment; (e) importing symbols from the common code and linking the next individual code segment in the set of segments to produce an image; (f) extracting overlay code and data from the image produced in step (e); (g) checking if more segments exist in the set, if yes, then return to step (e), else proceed to step (h); and (h) concatenating the overlays into a file which can be referenced by the overlay manager.

According to still another aspect of the present invention, provided herein is a method for generating program overlays from a sequence of program code, the program code having common code area and overlay code area, each overlay having a set of code and related data contained therein, the overlays being transferred via an overlay manager from a storage area to a receiving area for processing, the method comprising the steps of: (a) analyzing the overlay code area and determining the function entry points for each overlay; (b) creating an overlay control file for each overlay, whereby the overlay control file describes each pair of code and data associated with each overlay; (c) generating a wrapper file from the overlay control file; (d) creating a linker command file for the common area; (e) creating a linker command file for the overlay area; (f) performing an initialization for the overlay; (g) creating a common image for the code and data; (h) producing overlay sections from the image; (i) producing an overlay sections file; and (j) producing an load command file, whereby the command file will load the overlay sections file into the appropriate receiving area.

It is understood that other embodiments of the present invention will become readily apparent to those skilled in the art from the following detailed description, wherein shown and described are only example embodiments of the invention by way of illustration. As will be realized, the invention is capable of other and different embodiments, and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWING

Certain aspects and advantages of the present invention will be apparent upon reference to the accompanying description when taken in conjunction with the following drawings, which are exemplary, wherein:

FIG. 8A shows certain representative code that might be included in the linker command file for the common area.

FIG. 8B shows certain representative code that might be included in the linker command file for the overlay area.

DESCRIPTION OF THE PREFERRED EMBODIMENTS

The present invention is described below in terms of certain preferred embodiments and representative applications. The example apparatus and processing methods are intended to be used with any communication system that would benefit from having a reduced memory footprint, and particularly a processor intensive device, such as a DSP. A reduction in memory on any type of device facilitates reduction of the overall size, cost, and complexity of the device, wherein DSPs are generally associated with more costly memory. Information and data might be stored and accessed from many types of external storage devices. Moreover, the information and data might be stored and processed in an associated parallel processor having lower cost memory.

Figure 1:
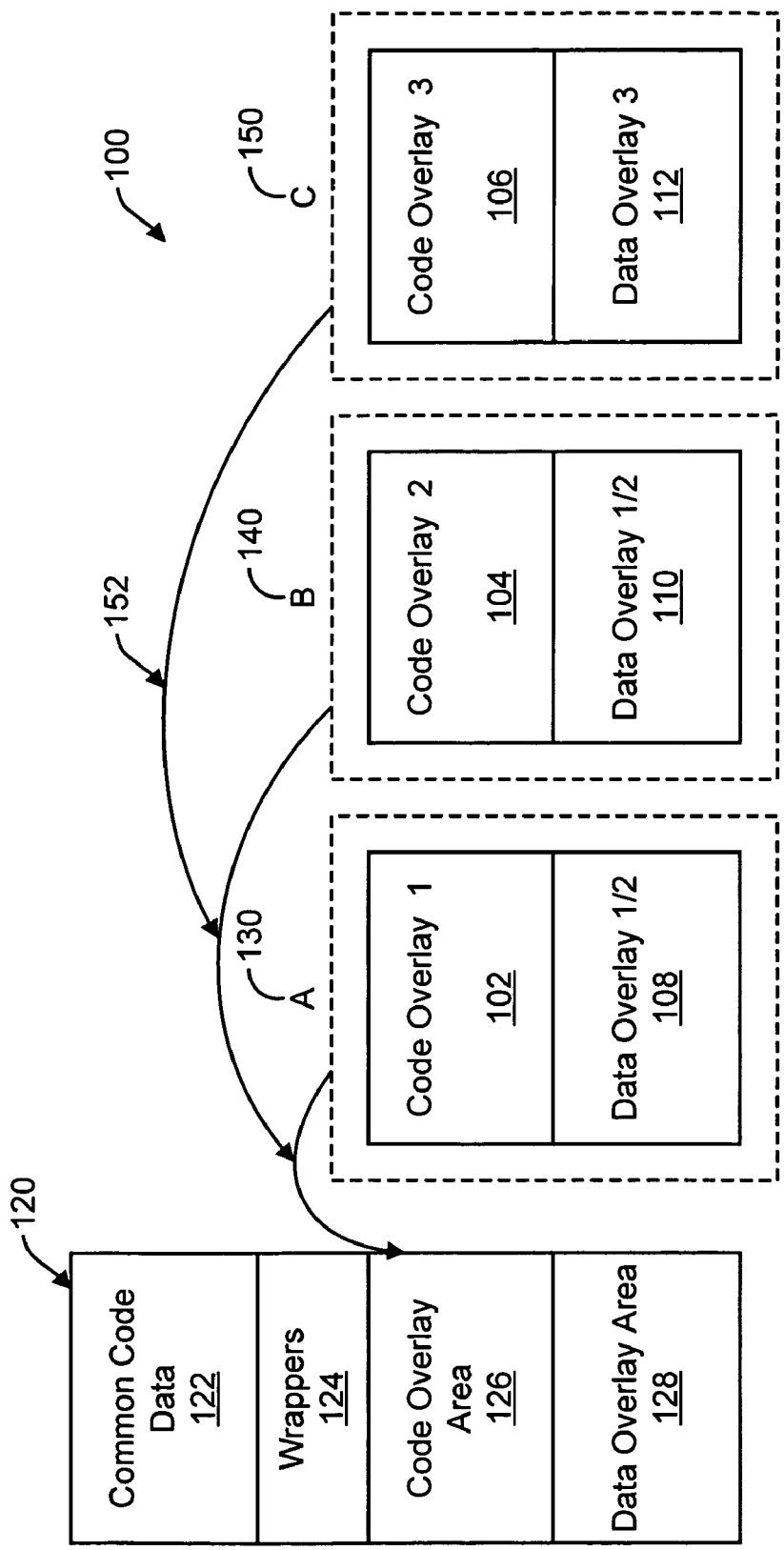
FIG. 1 is a block diagram of representative overlay scheme.
Figure 2:
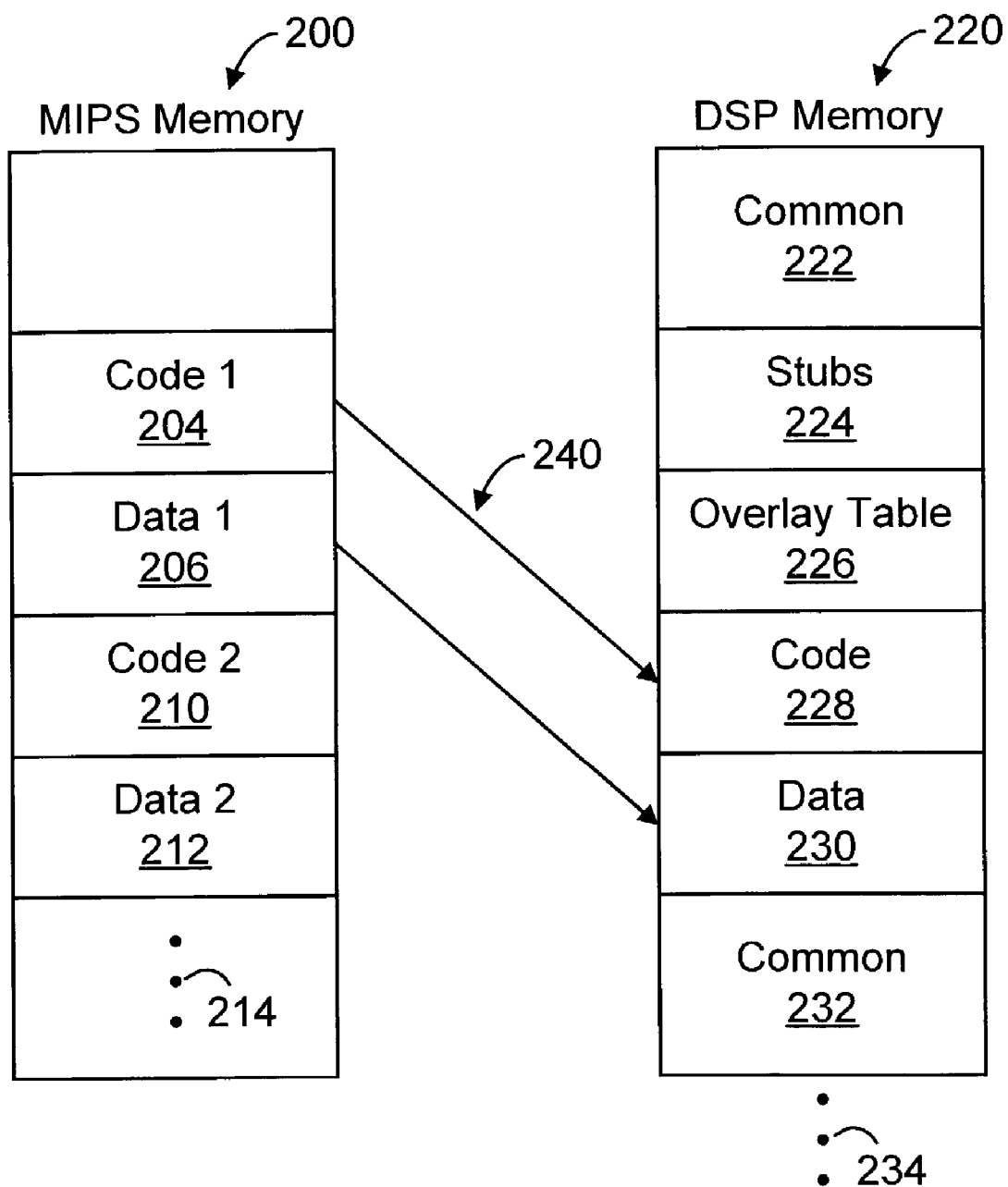
FIG. 2 is a block diagram, according to one aspect of the present invention, of a representative MIPS memory area for storing overlays and a DSP memory for receiving the transferred overlays.

FIG. 2 shows a representative MIPS memory segment 200 having certain overlay sections formed therein. According to the principles of the present invention, the first representative overlay section 202 includes a first code section 204 and a first data section 206, having the data associated with the first code section. The second overlay section 208 includes a second code section 210 and a second data section 212. Similar overlay sections continue through the allocated MIPS memory area, as implied by the continuation indicator 214.

A representative DSP memory segment 220 is also shown, with the arrangement of the various memory areas being arbitrary and for example purposes only. A common area 222 is shown for holding information that is more efficiently stored on the DSP. Certain associated overlay stubs are shown in area 224. An overlay table is shown in area 226. This table maps new entries with an ongoing concatenation of such entries, with the table being used to indicate where to pull the various overlays into the DSP memory. Next an area 228 is shown for holding the code, and an area 230 is shown for holding the data in the various overlays 202, 208, and so forth. Thereafter, another common area 232 is shown. The DSP memory segment is not meant to be limited to the specific segments shown and might continue with other segments as shown by the continuation indicator 234. When needed, the overlay code/data is transferred from the MIPS memory over to the DSP memory. The transfer arrows 240 show the first overlay section 202, which includes Code 1 (204) and Data 1 (206) being transferred from the MIPS memory 200 over to the respective receiving areas 228 and 230 in the DSP memory area 220.

A linker (also sometimes referred to as a linker editor or binder) is a program that combines object modules (or the like) to form an executable program. Many programming languages allow a developer to separately write different pieces of code, called modules. This simplifies the programming task because a large program can be broken into smaller, more manageable pieces. Eventually, however, the modules need to be pulled together. This is the task of the linker. In addition to combining modules, a linker also replaces symbolic addresses with real addresses. Therefore, a developer might need to link a program even if it contains only one module.

Figure 3A:
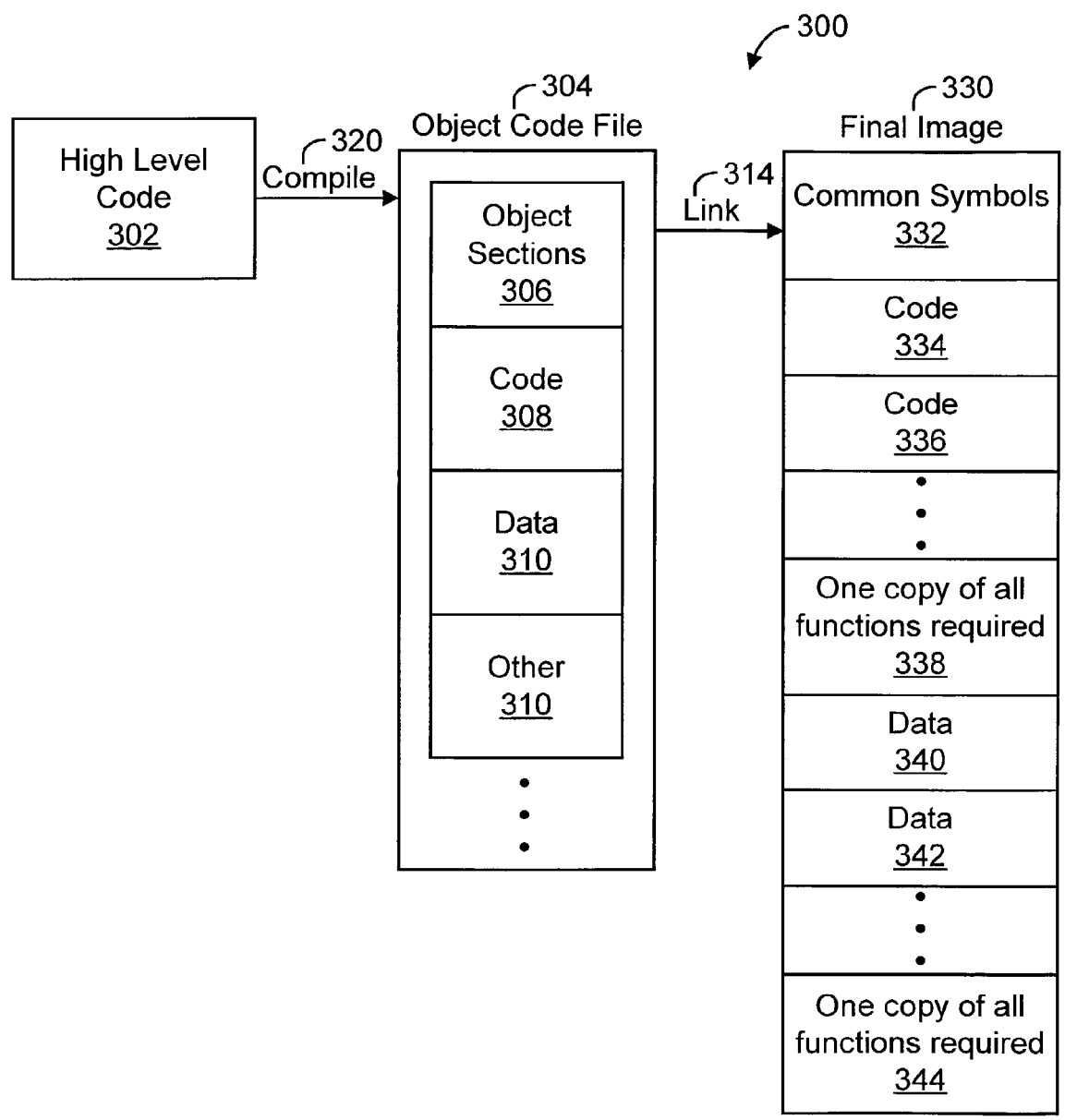
FIG. 3A is a block diagram of a prior art representation of the code that results from prior compilation and linking strategies.

Certain results of prior linker technology are shown via the representative blocks 300 in FIG. 3A. In general a compiler takes source code and produces object code. The linker then takes object code and libraries to produce the final image. According to the following example, a high level code 302 is shown to exist as a code file 304. Such high level code might include commonly used development languages, such as C, or C++ or the like. The object code file 304 is shown to include object sections 306, which might include code 308, data 310, or other such information 312. Several object files are often gathered together into a collection called a library, wherein this library contains a variety of functions that might be called. A compiler 320 is then used to compile the code file. The compiler pulls in all references as needed, including data and/or function calls via the objects and object libraries. A linker 314 then uses the object code files and libraries to produce the final image. The resolved information, or final image, is shown in the representation of the main memory area 330. Common symbols 332 are shown which include constants shared by many different routines. Various segments of code 334, 336, and so forth are shown thereafter. A function (mathematical or otherwise) is shown stored in area 338. Only one copy of the function is located in the main memory and other routines are referenced to this code section for that function. Thereafter, various segments of data 340, 342, and so forth are shown. The data stored in main memory area 344 illustrates that only one copy of all the data is stored in this main memory area. Any algorithm code or software that needs to use this data is referenced to this one data storage area in the main memory.

Figure 3B:
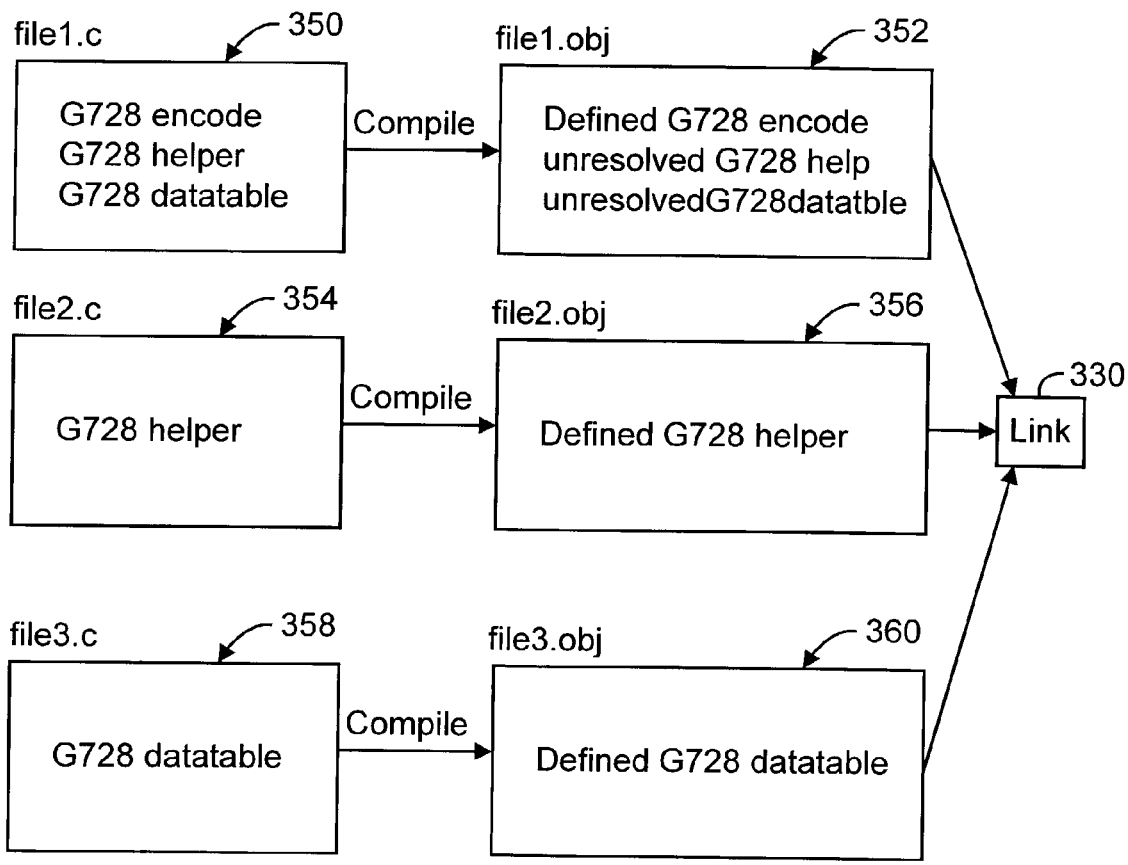
FIG. 3B is a block diagram of a prior art representation of "C" source files and object files as used by a traditional linking strategy.

A more specific example of a traditional linker is shown in FIG. 3B. A representative file1.c 350 (i.e. a "C" file) is shown to include encode, helper, and datatable sections from the G.728 standard (for example). When compiled, the object file, file1.obj 352 shows that the G.728 encode section is defined, but that the G.728 helper section and G.728 datatable section are unresolved. The linker will therefore look to pull in other files to resolve these sections. The G.728 helper section is contained in file2.c 354, which is compiled to provide a corresponding object file 356. The G.728 datatable section is contained in file3.c 358, which is compiled to provide a corresponding object file 360. The linker 370 will therefore keep pulling in information from these other object files until everything is resolved. Thereafter, a memory block will contain all of the relevant code and the associated data. After the code is linked in this manner, however, there is no convenient way of discerning which particular piece of data goes with a particular piece of code.

In order to achieve the preferred overlay configuration of the present invention, known linker technology is utilized with multiple passes through the code until all of the data is isolated for each segment of overlay code. Additionally, this approach allows for multiple copies of function code to be placed into different overlay sections. For instance, many different code implementations might need certain functional code, such as a mathematical multiplier or the like. Prior linker implementations generally link-in this functional code once, and then other overlays will refer to this functional code when it is needed. The present invention provides for multiple copies of the functional code in each of the overlays.

Figure 4A:
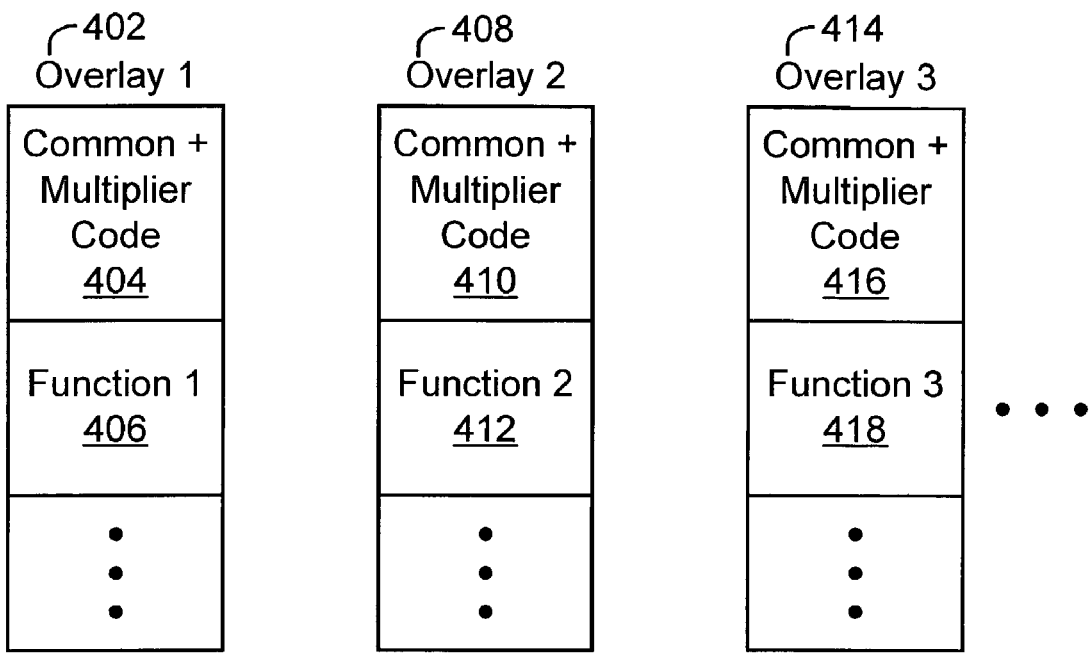
FIG. 4A is a block diagram of a prior art representation of overlays that might be generated by a traditional linking strategy.

For instance, referring now to FIG. 4A, three representative prior art overlay sections are shown. For purposes of this example, functions 1 and 2 utilize the multiplier code, whereas function 3 does not. Overlay section 1 (402) is shown to include a common area 404 having multiplier code and an area 406 having code for a first function. Overlay section 2 (408) is shown to include a common area 410 having multiplier code, along with an area 412 having code for second function. Overlay section 3 (414) is shown to include a common area 416 having multiplier code, along with an area 418 having code for a third function. The common area therefore redundantly includes the copy of the multiplier code, even if the functional code associated with the overlay section does not necessarily use it.

Figure 4B:
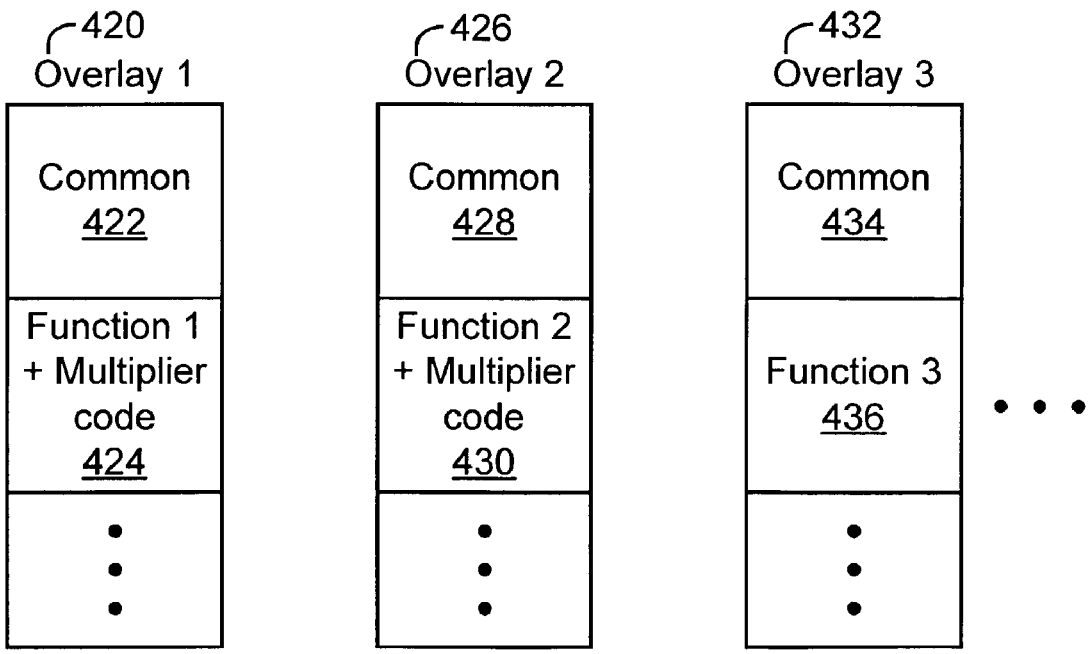
FIG. 4B is a block diagram, according to one aspect of the present invention, of representative overlays that might be generated by the linking strategy of the present invention.

FIG. 4B next shows three representative overlay sections according to the present invention. Overlay section 1 (420) is shown to include a common area 422 and an area 424 having code for a first function and multiplier code. Overlay section 2 (426) is shown to include a common area 428, along with an area 430 having code for second function and multiplier code. Overlay section 3 (432) is shown to include a common area 434, along with an area 436 having code for a third function (but no multiplier code). In this example, more code space is available for the third function, since it does not use the multiplier code and thereby does not include a copy of the multiplier code in the overlay. In FIG. 4A, the multiplier code occupies extra space in overlay 3 (414) even though function 3 does not use it.

Thereafter, an image is created for each overlay which allows for swapping in both code and data, rather than just code. A traditional linker is used, but the linker does not know about previous image overlays. In FIG. 4A, each overlay must copy in the math function (i.e., multiplier code or the like) which has been stored in the common area. According to the present invention, the multiplier code will be included where it is needed in association with the function code, but not included otherwise.

Figure 5A:
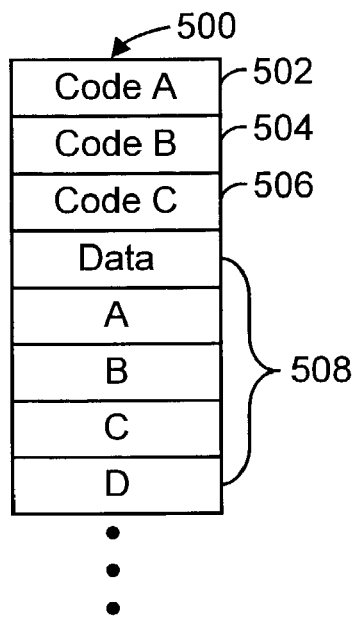
FIG. 5A is a block diagram of a prior art representation of linked code that might be generated by a traditional linking strategy.

The linker will also provide separation of the data necessary for each section of code that might be overlayed into the target memory. FIG. 5A shows a prior art representation of a main memory area 500, wherein the linker has sequentially arranged first code section (Code A) 502, a second code section (Code B) 504, and a third code section (Code C) 506. Thereafter, the memory area 500 contains the data sections 508, arranged as sections A, B, C, D, and so forth.

Figure 5B:
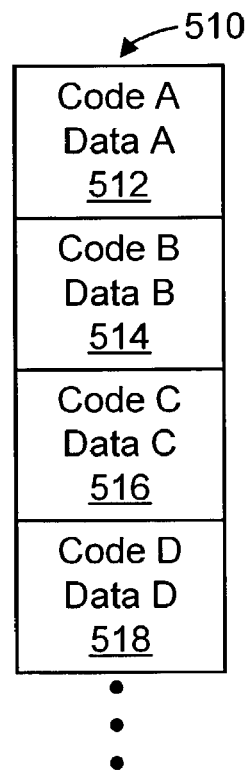
FIG. 5B is a block diagram, according to one aspect of the present invention, of representative overlays that might be generated by the linking strategy of the present invention.

With the use of the present invention, FIG. 5B shows a main memory area 510 arranged instead to have the code segmented into overlays, with each overlay also containing the associated data for that code. For instance, the memory area includes a first overlay 512 having Code A and Data A information, a second overlay 514 having Code B and Data B information, a third overlay 516 having Code C and Data C information, and a fourth overlay 518 having Code D and Data D information. Accordingly, each overlay will have a self-contained set of information that can be processed from the receiving memory segment on the target processor (or the like).

In particular, the present invention utilizes an Overlay Manager which might also be referred to a directed cache manager (DCM). Hence, to address the requirements for smaller memory footprints, certain services (i.e., voice, data, fax and so forth) need to be broken down into smaller execution blocks and thereafter downloaded on demand. The execution blocks, or code overlays, may also have corresponding read-only data overlays (typically tables). Once the code has been partitioned into code and data overlays of a suitable size, the use of the DCM is essentially transparent.

Figure 6A:
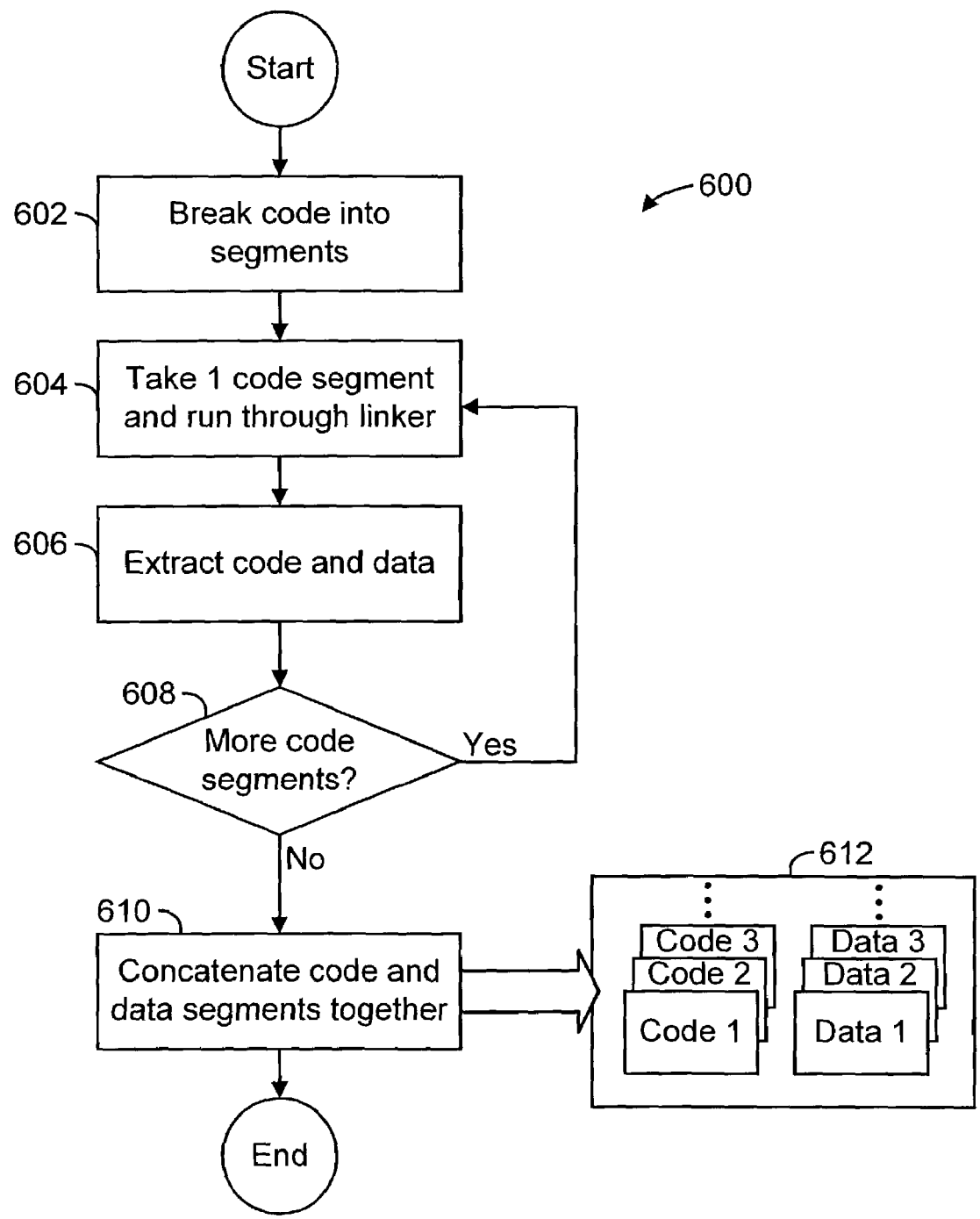
FIG. 6A is a flowchart of certain generalized representative steps, according to one aspect of the present invention, that can be used to generate overlays with code and related data.

FIG. 6A first shows certain representative steps 600 that might (generally) be used to isolate the data and create the desired overlays. The code exists as a set of functions, routines and/or data. To break the code into segments, as per step 602, a human must discern which routines should or should not be broken up due to efficiency concerns. For instance "for loops" should not be broken in the middle.

Also, if data is referred to again and again, then that data should be located in the appropriate segment along with the code that uses the data. Once the code is broken into segments, step 604 shows the process of taking one code segment and running it through the linker. Step 606 shows the general process of extracting the code and the data. Step 608 inquires whether there are more code segments. If yes, then the steps 604 and 606 are repeated for each code/data segment pair. When no more code segments exist, step 610 shows the process of concatenating the code and data segments together into paired sets that can be loaded from low cost memory into higher-cost memory on an as-needed basis by an overlay manager.

Figure 6B:
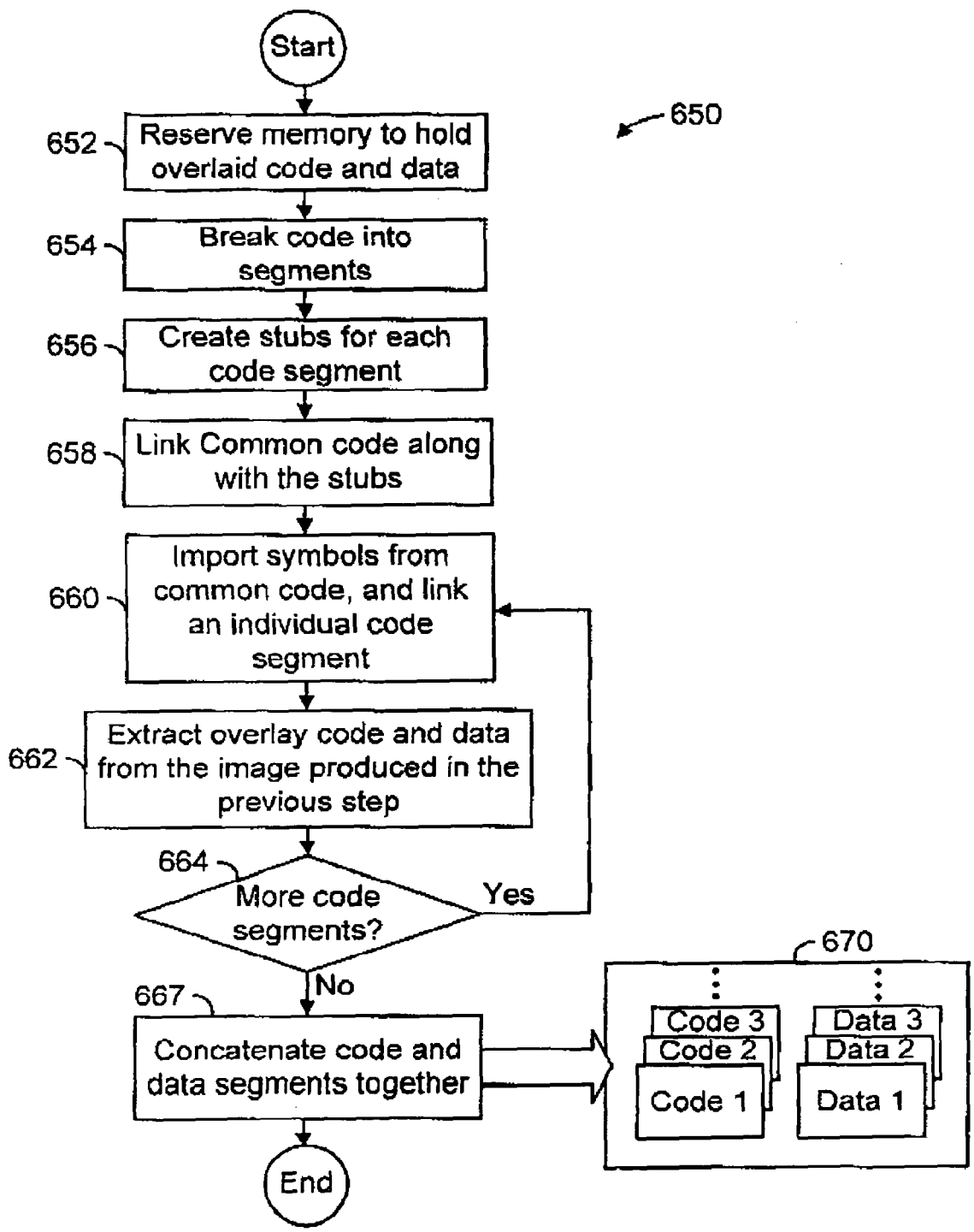
FIG. 6B is a flowchart of more particular representative steps, according to one aspect of the present invention, that can be used to generate overlays with code and related data.

FIG. 6B next shows more details of certain representative 650 steps that might be used to isolate the data and create the desired overlays. Step 652 shows the process of reserving a section of memory to hold the overlaid code and data. Step 654 next shows the process of breaking the code into segments. The code portion of the program, i.e., the portion that will be put into overlays, is broken into segments. An additional portion of the code which will be common (not overlaid) is partitioned as a separate portion. Each overlay segment must be small enough to fit into the memory area reserved in step 652.

Step 656 next shows the process of creating stubs for each code segment. These stubs will be used as entry points into the code overlays. Step 658 next shows the process of linking together the common portion of the image by using the stubs instead of the real code segments. All of the common code and data will be linked together, along with the reserved areas for the overlaid code and data.

Step 660 shows that for each code segment, all of the symbols are imported from the common portion of the image, along with the code segment in question. This step will link in all of the non-common code required by the code segment, as well as all the data which is used only by the particular code segment in question.

In step 662, the process includes extracting the code overlay and data overlay created in step 660. The data that is extracted is now known to be required by only the code overlay that was extracted. A small header is thereafter attached to the front end of each overlay, thereby identifying the segment.

The inquiry block 664 next checks whether there are more code segments to be considered. If yes, then steps 660 and 662 are repeated. If no more code segments, then step 667 shows the process of concatenating all of the code and data overlay segments together. An example of the concatenated segments is shown in 670. Each overlay therefore consists of a paired code and data section (i.e., code1/data1, code2/data2, code3/data3, and so forth). This concatenated image will be placed in external memory, and the appropriate portions can then be brought into the DSP memory (or like device) at the appropriate time by an overlay manager (or the like).

Thereafter, since the data has been isolated that belongs to each code overlay, when a function from a code overlay is called, the stub (as created in step 656) will be the initial entry point. This stub will serve to transfer the code overlay and the associated data overlay from the external memory into the reserved areas in local memory. In the event that one code overlay transfers control into another code overlay, the contents of the reserved data area can be transferred back into external memory to preserve any updates that may have been made to the data.

Figure 7:
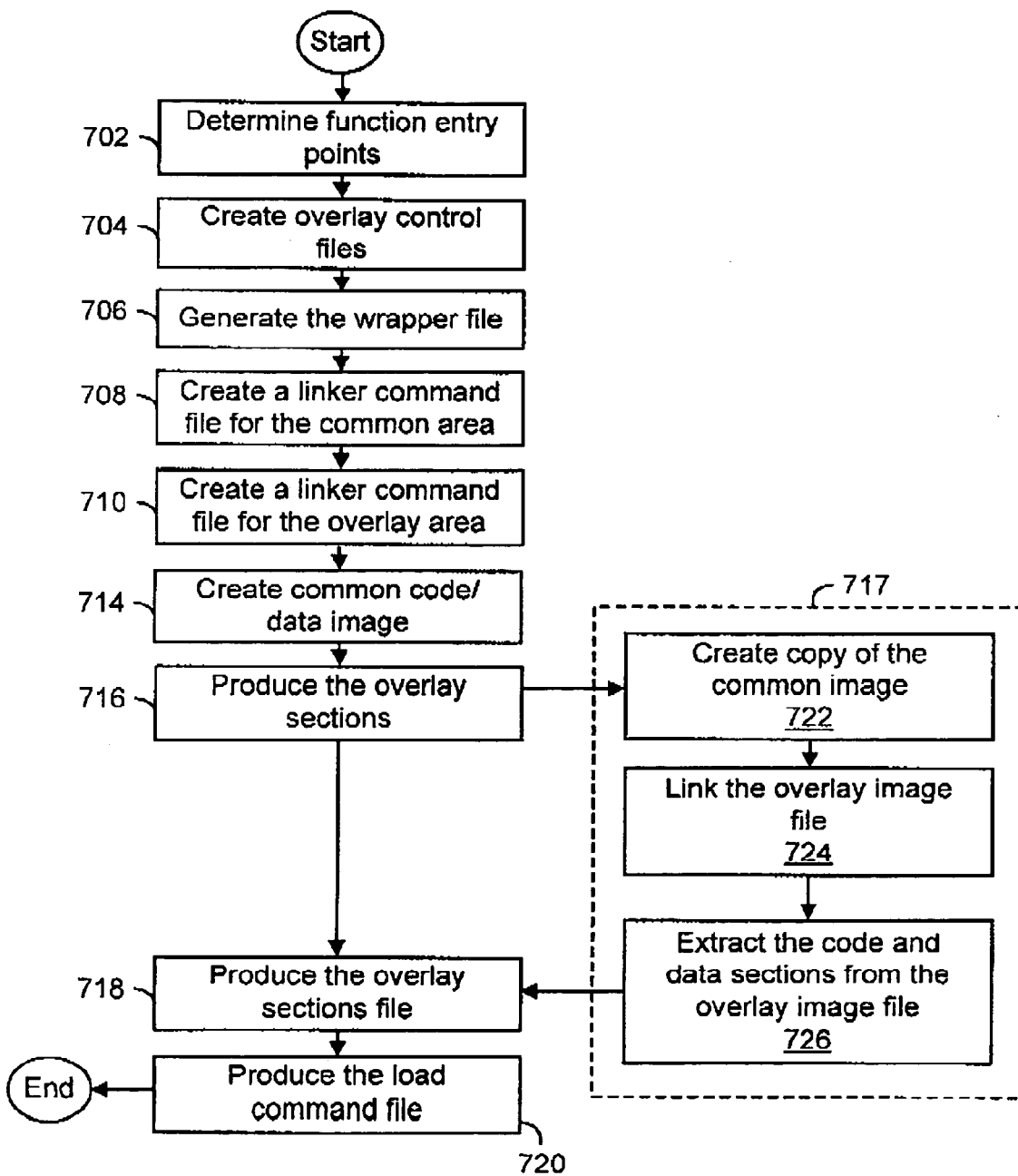
FIG. 7 is a flowchart of still other representative steps, according to one aspect of the present invention, that can be used to generate overlays with code and related data.

These same general steps are detailed in a more particularized example, as shown in FIG. 7. Before detailing these steps, certain definitions will be described. While particularized to this example, the functionality described is intended to be applicable to other such systems and configurations as well.

Overlay control file—Each pair of code/data overlays is described by an overlay control file. The overlay control file is a text file, which is created by a person, and contains commands that describe the overlay in question. For the example shown in FIG. 4B, involving three overlay files, the file might include the following:

TABLE 1

| A.ovl | B.ovl | C.ovl |
| --- | --- | --- |
| OvlFunction func1 | OvlDataSectionPrefix A_ OvlFunction func2 | OvlFunction func3 |

Note that the overlay control file might include a snippet of Bourne Shell Code, and consequently might also use Bourne Shell comments (which start with the # character). Various commands, as shown (or otherwise) in Table 1 representing the overlay control file, might include the following:

OvlCodeSectionName (Overlay Code Section Name)—A section named by such a command will be extracted from the file given by OvlElfFileName (see below) and used as the code overlay. A default value might include ".text".

OvlCodeSectionPrefix (Overlay Code Section Prefix)—This command sets the prefix used to uniquely name the code overlay. The default value for the code section prefix is the base portion of the overlay control file (minus the file extension) following by an underscore.

OvlDataSectionName (Overlay Data Section Name)—The section named by this command will be extracted from the file given by OvlElfFileName and is used as the data overlay. A default value might include ".data".

OvlDataSectionPrefix (Overlay Data Section Prefix)—This command sets the prefix used to uniquely name the data overlay. The default value for the data section is the base portion of the overlay control file (minus the file extension) followed by an underscore. If a data overlay is going to be shared between several code overlays, then all of the OvlDataSectionPrefix's should be set to the same value.

OvlElfFileName (Overlay ELF File Name)—This command names the ELF file that contains the actual overlay sections. The default value might include the base portion of the overlay control file (minus the extension) followed by ".out".

OvlFunction (Overlay Function)—The command names a function that will be considered as an entry point into the code overlay. Multiple functions may be specified for each code overlay. The function names can be specified without the leading underscore, which can be added by the compiler.

MakeOverlayWrapper (Make Overlay Wrapper) script—The make overlay wrapper script reads an overlay control file and generates wrapper functions for each function described by an OvlFunction command. The generated wrapper is in assembly language (as corresponding to a particular processor, DSP or the like) and includes the following: (a) An overlay descriptor—The overlay descriptor resides in common data and contains information about the overlay (i.e., where the overlay is located in external RAM and the various function entry points); (b) The wrapper function—This is the "entry point" to the overlay function. If the overlay is already loaded, then it will call directly into the overlay, otherwise it will call the fault function. (c) The fault function—This function causes the overlay code and data sections to be paged from external memory into processor memory.

MakeOverlayPage (Make Overlay Page) script—reads an overlay control file. Using this information, the script extracts the appropriate overlay code and data sections from the ELF file. These extracted sections are later concatenated together to create a larger image that is resident in external RAM. This script calls a GetElfSection.exe program which generates each code or data overlay section consisting of a header followed by actual section data. In order to satisfy the DMA alignment criteria, both the header and the data are padded out to an exact multiple of 4 words (8 bytes). The header might consist of the following:

TABLE 2

| Type | Name | Description |
| --- | --- | --- |
| SINT16 | headerSize | Size of the header (in words) |
| UINT16 | sectionSize | Size of the section (in words) |
| UINT16 | numFuncs | Number of function pointers present in funcAddr present in funcAddr |
| UINT16 | funcAddr[0 . . . numFuncs] | Array of function entry points |
| UINT16 | sectionName (null terminated) | String containing the section name |

Note that the sectionName field is an array of processor (DSP or the like) characters which might include an array of 16 bit entities. This means that each character occupies 16 bits.

In step 702, the function entry points are determined. This important step is used to decide which functions will go into which overlays. Generally, it is only necessary to decide the "entry point" routines, and thereafter any remaining routines might be determined automatically.

In step 704, the overlay control files are created, with one overlay file for each overlay. Generally, the overlay control file might only need to contain an OvlFunction entry for each function entry point required in the overlay.

Step 706 next shows the generation of the file wrapper. This is achieved by running the MakeovlerayWrapper script on the overlay control file to produce the generated wrapper file.

Step 708 shows the process of creating a linker command file for the common area. Certain processors might be used, including a GNU ZSP processor. The ZSP is an LSI processor. A GNU linker is a version with certain modification by LSI. Certain linker tools (e.g., GNU linker or the like) make use of a linker command file that describes the various memory regions. FIG. 8A shows a representative linker command file for the common area. Note that the ".ALIGN (4)" command is required to guarantee that the overlay areas are aligned on a 4 word boundary. This is required since the MIPS memory bus is generally a 64 bit bus, and the DMA controller (see incorporated references) used to transfer the data from the MIPS memory space to the memory-constrained processor (i.e., DSP or the like) must be aligned to the memory bus. Hence, 4 ZSP words of 16 bits each gives a 64 bit alignment.

Step 710 next shows the process of creating a linker command for the overlay area. A linker command file is needed that describes the various memory regions for producing an overlay. A representative command file is shown in FIG. 8B.

Step 714 creates the common code/data image. Now that all of the generated wrapper files and the linker command file are present, the process can proceed to create the common code/data image. The common code/data image should include everything that is not to be swapped between storage areas, including for instance the operating system, common math routines, scheduling algorithm(s), memory management routine(s), and interrupt handler(s). Creating the common code/data image is done in generally the same manner as producing a normal image. The overlay wrapper files should be listed before the libraries containing the same functions. Otherwise, the functions that are desired in the overlay area will be placed in the common area. Thereafter, the map file should be examined to ensure that the code that was intended to go into the overlay area did not go into the common area.

In step 716, the overlay sections are produced. With the common image now generated, a set of overlay sections can be produced for each overlay that is needed. Step 716 might involve certain representative sub-steps, as shown in block 717. In step 722, a copy of the common image is created. Generally, the symbols from the common image need to be imported when producing the overlay (so that the overlay can call routines contained in the common area). Unfortunately, the wrapper routines contained in the common image can have the same names as the real routines that are to be placed in the overlay section. In order for the linker to pull the desired routines into the overlay area, the entry point symbols need to be removed for the overlay that is to be built. This might be accomplished using the "sdobjcopy" utility, in conjunction with an OverlayFuncList script, and properties of makefile, namely:

Sdobjcopy $(addprefix -N , $(shell bash OverlayFunctList overlay.ovl)) common.out\A_common.out Note that the "-N" option on this call causes the named symbol to be removed. The OverlayFuncList script prints out a list of function names from an overlay control file. The command $(shell bash OverlayFuncList overlay.ovl)) causes a list of function names to be echoed. The command $(add prefix -N, . . . ) cause each filename to be preceded by the -N option. Hence, for the example A.ovl from above, the final sdobjcopy command might resemble: sdobjcopy -N func1 common.out A_common.out The generated image file, A_common.out, now has all of the common symbols except for the ones for the overlay that is being presently constructed.

In step 724, an image next is linked together for a particular overlay, via a command such as:

sdld -o overlay.out -Map overlay.map -R overlay_common.out -T cfg/linkovl.cmd \$(addprefix -u, $(shell bash OverlayFuncList overlay.ovl))

Note that the -R option causes all of the symbols from the overlay_common.out file to be imported. The -u option causes the symbols required for the overlay to be undefined, which in turn causes the linker to pull them in from the specified libraries.

Step 726 next extracts the code and data sections from the overlay image file. This is done using the MakeOverlayPage script, and running the command: MakeOverlayPage overlay.ovl, which will produce overlay_text.sec and overlay_data.sec. The map file should thereafter be inspected to ensure that the expected code and variables were pulled into the code and data overlay areas. The data is generally "read-only", as it is transferred from the MIPS to the DSP, but not back again. Typically, the data takes the form of lookup table data.

Step 718 next produces the overlay sections file. All of the ".sec" files can be concatenated together to create one large file. As a marker for the end of the file, a special .sec file can be used, called empty.sec, which consists of two null bytes at the very end of the overlay.sec file. This might be accomplished via the echo command: echo -n -e "\000\000">empty.sec.

Step 720 next produces the load command file. The load.cmd file is a GDB script file that will load the overlay.sec file into the appropriate area of MIPS memory. It might be generated using the following command: bash makeOverlayLoader -v -o load.cmd overlay.sec.

An initialization routine might also be performed on the overlay. This routine serves to match up the overlay sections (found in MIPS RAM) with the overlay descriptors (found in DSP RAM). The common code calls a routine, which might be called dcmlnitOverlay, prior to calling any of the wrapper entry points. This routine includes a header file called "hlshmcfg.h", which should contain the following functions or macros: mcfgZspOvlyPagAddrh( ) and mcfg-ZspOvlyPagAddrl( ). These two functions return the high and low portions of the 32 bit byte address containing the beginning of the overlay section in external RAM. A representative algorithm might include: (1) Initialize the num field in each of the overlay descriptors to a zero-based index value. (2) Walk through each of the overlay sections and perform the following: (a) Determine the overlay descriptor to which the present overlay sections belongs. This is generally done by matching the sectionName from the overlay section with the code.name or the data.name field from the overlay descriptor. (b) Copy in the external address and size of the overlay section into the overlay descriptor. (c) If the overlay section corresponds to the code overlay, copy in the function address table from the overlay section into the loadedFuncAddr table, and setup the currFuncAddr table to have a copy of the faultFuncAddr table. Once initialization is complete, the wrapper functions can be called to cause the overlays to be loaded into memory.

The overlay wrapper function has been referred to above as an overlay stub, and the references are meant to be interchangeable. The overlay wrapper function loads a register from the currFuncAddr table and then jumps to the dcmCallNestedOverlay function. DcmCallNestedOverlay saves away the current overlay and return address on an internal stack. A subroutine call is thereafter performed to the function taken from the currFuncAddr table. If the required overlay is already loaded, then currFuncAddr will point directly to the overlay area. Otherwise it will point to the fault function (each function entry point has a corresponding fault function, which is also located in the generated wrapper file). If the fault function is called, it causes the corresponding code and data overlays to be loaded into memory and then transfers control to the function in the overlay area. When control returns to the dcmCallNestedOverlay routine, it restores the return address and the previous loaded overlay and returns. This behavior allows one overlay function to call another overlay function (from a different overlay), and also allows an interrupt routine to call an overlay function and have things restored so that the interrupted code resumes as if nothing happened.

Errors can be detected if the code or data exceeds the memory slot that has been designated to receive the code/data. If such errors are occur, then the process should go back to step of forming the overlay control file, with the segmentation adjusted accordingly.

Sharing data sections—In some situations, the data may be shared among several code overlays. In order for this to work properly, the data should appear in exactly the same order when both overlays are built. The easiest way of achieving this is to create a source file which #includes all of the other "C" (*.c) files which contain the data, and specifying the generated .obj file when building the overlay.

Although certain exemplary embodiments of the present invention have been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive. It is therefore intended that the following claims be interpreted as covering all such alterations and modifications as fall within the true spirit and scope of the invention.

The invention claimed is:

1. A method for generating program overlays from a sequence of program code, each overlay having a set of code and related data contained therein, the overlays being transferred via an overlay manager from a storage area to a receiving area for processing, the method comprising the steps of:
    (a) breaking the sequence of program code into a set of segments, wherein each segment contains a certain amount of related code for processing;
    (b) running a code segment in the set through a linker device;
    (c) extracting the code segment and related data segment produced by the linker device, with each associated pair of code and data segment representing an overlay;
    (d) checking if more segments exist in the set, if yes, then return to step (b), else proceed to step (e); and
    (e) concatenating the associated code and data segments into paired sets which can be referenced by the overlay manager.

2. The method according to claim 1, wherein the step of breaking the sequence of program code into a set of segments includes dividing the code into a common code area, and an overlay code area.

3. The method according to claim 1, wherein the step of breaking the sequence of program code into a set of segments includes sizing the program code segments so that they will fit within the receiving area.

4. The method according to claim 1, wherein the steps further include creating stubs for referencing each function in each program code segment, the stubs being stored in the receiving area.

5. The method according to claim 4, wherein the steps further include generating an overlay table to be used in facilitating transfer of the overlays from the storage area to the receiving area, the overlay table being stored in the receiving area.

6. The method according to claim 1, wherein the storage area includes an external storage means.

7. The method according to claim 1, wherein the storage area includes memory associated with a low-MIPS processing device.

8. The method according to claim 1, wherein the receiving area includes memory associated with a high-MIPS processing device.

9. The method according to claim 8, wherein the high-MIPS processing device includes a digital signal processor.

10. The method according to claim 1, wherein after the concatenating step, the information is converted into a form usable by a processor.

11. The method according to claim 10, wherein the form includes a source file of a high-level programming language.

12. A method for generating program overlays from a sequence of program code, the program code having common code and code to be overlaid, each overlay having a set of code and related data contained therein, the overlays being transferred via an overlay manager from a storage area to a receiving area for processing, the method comprising the steps of:
 (a) reserving a memory segment in the receiving area to hold overlaid code and data;
 (b) breaking the sequence of code to be overlaid into a set of segments, wherein each segment contains a certain amount of related code for processing, and each segment is sized to fit in the reserved memory segment;
 (c) creating stubs for each code segment, whereby the stubs represent entry points for functions within each code segment;
 (d) linking the common code along with the stabs for each code segment;
 (e) importing symbols from the common code and linking the next individual code segment in the set of segments to produce an image;
 (f) extracting overlay code and data from the image produced in step (e);
 (g) checking if more segments exist in the set, if yes, then return to step (e), else proceed to step (h); and
 (h) concatenating the associated code and data segments into paired sets which can be referenced by the overlay manager.

13. The method according to claim 12, wherein the storage area includes an external storage means.

14. The method according to claim 12, wherein the storage area includes memory associated with a low-MIPS processing device.

15. The method according to claim 12, wherein the receiving area includes memory associate with a high-MIPS processing device.

16. The method according to claim 15, wherein the high-MIPS processing device includes a digital signal processor.

17. The method according to claim 12, wherein after the concatenating step, the information is converted into a form usable by a processor.

18. The method according to claim 17, wherein the form includes a source tile of a high-level programming language.

19. A method for generating program overlays from a sequence of program code, the program code having common code area and overlay code area, each overlay having a set of code and related data contained therein, the overlays being transferred via an overlay manager from a storage area to a receiving area for processing, the method comprising the steps of:
 (a) analyzing the overlay code area and determining the function entry points for each overlay;
 (b) creating an overlay control file for each overlay, whereby the overlay control file describes each pair of code and data associated with each overlay;
 (c) generating a wrapper file from the overlay control file;
 (d) creating a linker command file for the common area;
 (e) creating a linker command file for the overlay area;
 (f) performing an initialization for the overlay;
 (g) creating a common image for the code and data;
 (h) producing overlay sections from the image;
 (i) producing an overlay sections file; and
 (j) producing a load command file, whereby the command file will load the overlay sections file into the appropriate receiving area.

20. The method of claim 19, wherein the step of producing overlay sections from the image includes the following steps:
 (a) creating a copy of the common image, whereby the entry point symbols are removed from the particular overlay to be built;
 (b) linking together an image for a particular overlay to form an overlay image file; and
 (c) extracting the code and data sections from the overlay image file.

21. The method of claim 19, wherein the step of generating a wrapper file reads the overlay control file and generates wrapper functions for each function described therein.

22. The method of claim 21, wherein the wrapper file includes:
 an overlay descriptor, which resides in common data and contains information about the overlay;
 the wrapper function, which is the entry point to the overlay function; and
 a fault function, which causes the overlay code and data sections to be paged from the storage area to the receiving area.

23. The method according to claim 19, wherein the storage area includes an external storage means.

24. The method according to claim 19, wherein the storage area includes memory associated with a low-MIPS processing device.

25. The method according to claim 19, wherein the receiving area includes memory associated with a high-MIPS processing device.

26. The method according to claim 25, wherein the high-MIPS processing device includes a digital signal processor.

27. The method according to claim 19, wherein after the concatenating step, the information is converted into a form usable by a processor.

28. The method according to claim 27, wherein the form includes a source file of a high-level programming language.

* * * * *